May 24, 1966  R. L. PROPST  3,252,249
CROP THINNER

Filed April 29, 1964  2 Sheets-Sheet 1

INVENTOR.
ROBERT L. PROPST
BY
Price & Heneveld
ATTORNEYS

May 24, 1966  R. L. PROPST  3,252,249
CROP THINNER

Filed April 29, 1964  2 Sheets-Sheet 2

INVENTOR.
ROBERT L. PROPST
BY
ATTORNEYS

United States Patent Office 3,252,249
Patented May 24, 1966

3,252,249
CROP THINNER
Robert L. Propst, Ann Arbor, Mich., assignor to Herman Miller, Inc., Zeeland, Mich., a corporation of Michigan
Filed Apr. 29, 1964, Ser. No. 363,450
8 Claims. (Cl. 47—1.43)

This invention relates to apparatus for thinning plants from a crop row. More particularly, this invention relates to such an apparatus which utilizes a pressurized jet stream for destruction of plants to be thinned from the row with a means for interrupting the stream for selectively saving plants therein.

Many types of apparatus are presently in existence for thinning plants from crop rows. Many crops planted in rows must be thinned in order to assure the best harvest potential. Even with the great variety of complex machines proposed to accomplish crop thinning, most of this work must still be done by hand. Consequently, this operation has become gradually more expensive as the cost of hand labor has gone up. With respect to crops such as sugar beets, the thinning operation has become the single most expensive operation. This is true also with respect to certain other crops.

Additionally, thinning often requires a laborer to crawl on hands and knees along the crop row using a short handled hoe in order to do the precise job necessary for good thinning. This kind of work is unusually fatiguing and extremely unpleasant. The many attempts made to develop mechanical thinneres usually include a structure for cutting out a set interval of plants in the row, and leaving a set interval, supposedly leaving only a single plant. This approach has not proven satisfactory because plants are invariably randomly spaced in a crop row. Consequently, mechanically spaced thinners are as likely to leave a blank space between plants as they are a single plant. At other times, doubles or triples likely to be left. Also, crop thinners which have been proposed in the past have been extremely cumbersome and complex, and therefore simply not adapted for the delicate job of thinning a crop row. Such ponderous machinery and the excess energy with which they operate have in fact proven undesirable.

It is an object of this invention to provide an improved apparatus for thinning plants from a crop row utilizing a pressurized source for destroying plants to be thinned from the crop row.

A further object of this invention is the provision of such an apparatus which additionally utilizes a means for interrupting the pressurized source for selectively saving plants in the crop row.

A further object of this nvention is the provision of such an apparatus which requires a very small amount of energy, yet provides absolute precision of operation.

A still further object of the invention is the provision of such an apparatus which is less expensive to fabricate and more durable because of its simplicity and absence of ponderous moving parts.

An additional object of this invention is the provision of such an apparatus which requires much less power to operate than conventional structures.

These and other objects of this invention will become apparent to those skilled in the relevant arts upon reading the following specification, in conjunction with the accompanying drawing, wherein.

Briefly, this invention relates to an apparatus for thinning plants from a crop row including a pressure source. Means are provided for directing pressure from the source into a jet stream and directing the stream toward a crop row for destruction of plants to be thinned therefrom. Means are also provided for interrupting the jet stream for selectively saving plants in the crop row.

Figure 1:
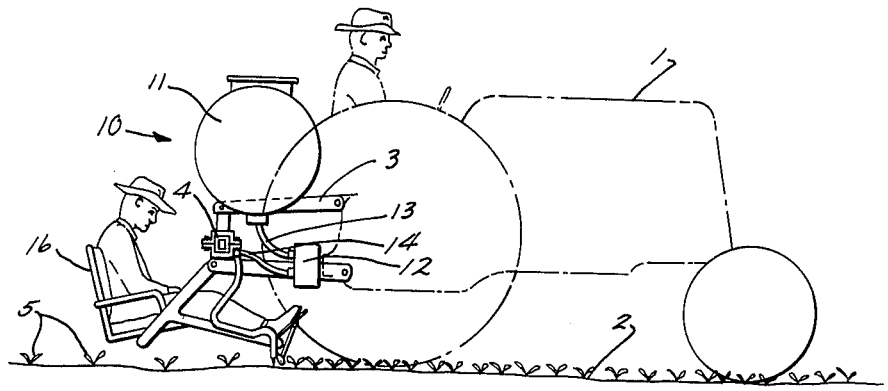
FIG. 1 is a side view of an apparatus utilizing the teachings of this invention, mounted on a tractor for movement along a crop row.
Figure 2:
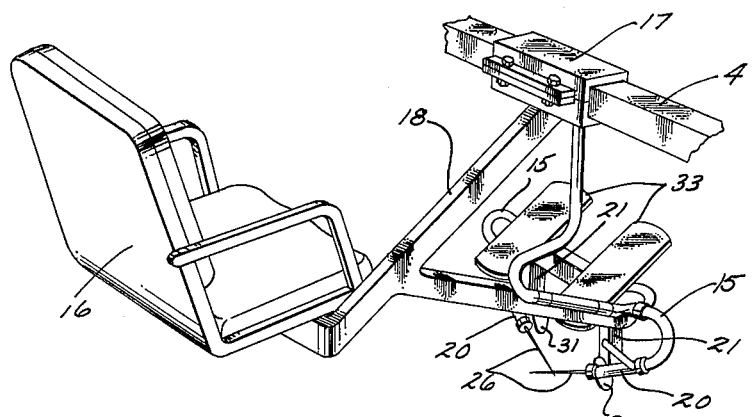
FIG. 2 is a plan, perspective view of the thinning elements and associated structure.

Referring more specifically to the drawing, the reference numeral 10 designates the thinning apparatus of this invention, mounted on a tractor 1 for movement along a crop row 2 (FIG. 1). The tractor 1 supports a frame 3 including a crossbar 4, the apparatus 10 being mounted on this structure. In the embodiment shown, the apparatus 10 includes a liquid supply source or water tank 11, a high pressure pump 12, jet nozzles 20 and interruption means 30 (FIGS. 1 and 2). The high pressure pump 12 is adapted to carry water from the tank 11 through the hose 13, pump it at high pressure to the hose 14, and on to the hoses 15 connected to the jet nozzles 20, to be described more fully hereinafter.

Figure 4:
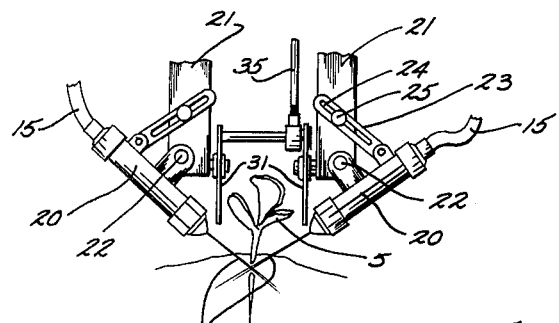
FIG. 4 is a front view of the thinning apparatus during the thinning operation.
Figure 5:
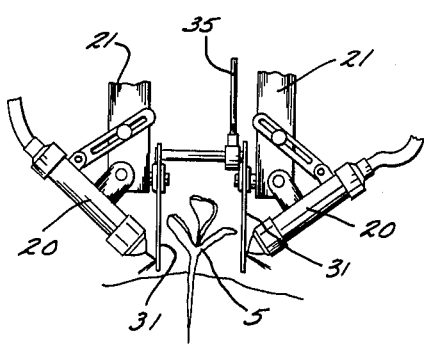
FIG. 5 is a view similar to FIG. 4, the interruption means positioned to stop the thinning operation.

A seat 16 for supporting an operator is secured to the crossbar 4 by means of the bracket 17, the arm 18 supporting the jet nozzles and interruption means to now be more fully described. The arm 18 rigidly supports vertical braces 21 (FIGS. 4 and 5), the jet nozzles 20 pivotally mounted on the braces 21 by means of the pins 22. An adjustment element 23, including a slot 24, adjustably secures the nozzles 20 in the desired position. Through tightening of the pins 25 into the braces 21, the pins extending through the slots 24, the exact angular positioning of the nozzles is accomplished. It will be noted that the nozzles are positioned one on each side of the crop row 2, pointing downwardly toward one another and the crop row. The nozzles are adjusted such that the pressurized streams emitted therefrom intersect one another below ground level, directly below the crop row itself. It will be seen that water under high pressure is emitted through the hoses 15, through the nozzles 20, continuously intersecting one another along the line of roots formed by the individual plants 5 in the crop row 2.

It has been found that such jets of high pressure water, designated by the reference numeral 26, demonstrate excellent cutting abilities for relatively soft materials such as plant fiber and loose earth. The ideal configuration targets the jet streams 26 to intersect each other from one-fourth inch to one-half inch under the mean surface of the earth. This is the center position of the plant and assures cutting deep enough to prevent growth from the root again. The intersecting jet streams assure positive cutting action, and the provision of two streams even assures that random interference from pebbles or clods does not prevent the thinning action.

Figure 3:
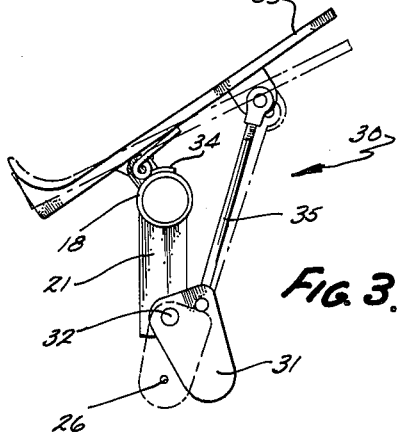
FIG. 3 is an enlarged side view of the interruption means.

In the embodiment shown, the interruption means 30 includes a pair of movable elements or plates 31, each pivotally secured at 32 on a respective brace 21 (FIG. 3). Foot pedals 33 are pivotally mounted on the arm 18 above the plates 31, springs 34 associated therewith for normally biasing the foot plates to the position shown in solid lines in FIG. 3. Connecting rods 35 pivotally connect the foot plates 33 to the interruption plates 31. Upon depression of the foot plates 33, the interruption plates move to the position shown in dotted lines in FIG. 3. It will be seen that this interrupts the water streams 26. Thus, individual plants 5 in a crop row 2 may be preserved by deflection of foot plates 33 by the operator, pivoting the interruption plates 31 in the paths of the pressurized water streams 26.

Figure 6:
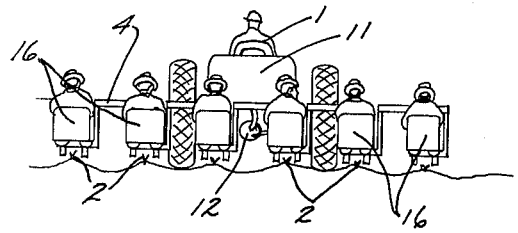
FIG. 6 is a schematic view of the back of a typical apparatus utilizing the teachings of this invention.
Figure 7:
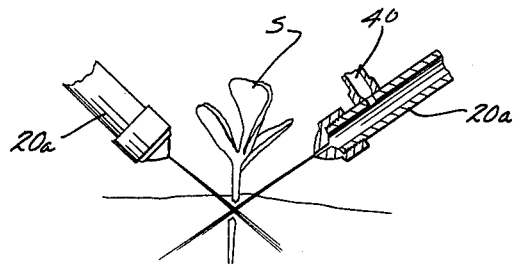
FIG. 7 shows an alternative construction of the thinning apparatus.

As shown in FIG. 6, a plurality of seats 16 together with associated pairs of jet nozzles 20 and interruption plates 31 may be mounted on a single crossbar 4, allowing several rows to be thinned simultaneously. FIG. 7 shows a slightly modified jet nozzle 20a, including an additional nozzle inlet 40 for the mixing of pressurized air with the water, thereby causing a mixture of air and water to be emitted from the nozzle 20a. Within the broadest aspects of this invention, it should be understood that pressurized air alone may be used for the destruction of plants to be thinned from the crop row.

In operation, operators sit on the seats 16, directly above a crop row 2, with feet resting on the foot plates 33. As the tractor 1 moves along the crop row, each operator watches the row and plants being thinned therefrom, since the jet water streams 26 ordinarily remove all plants from the row when the foot plates 33 are in normal position. When an operator wishes to save an individual plant 5, the foot plates 33 are depressed, the interruption plates 31 deflecting the water streams 26, thereby saving the plant chosen. Upon allowing the foot plates 33 to return to normal position, the jet streams 26 again remove all plants from the crop row. Within the broadest aspects of this invention, it should be realized that automatic means could easily be incorporated to trigger the actuation of the interruption means. Additionally, it should be noted that this structure is especially adapted for the addition of items, such as mild herbicides or fertilizers, to the jet stream for accomplishing a plurality of tasks in one operation.

It will now be seen that this invention has provided a vastly improved apparatus for thinning plants from crop rows. A simplified structure is provided, yet one which is extremely precise and accurate in operation. Ponderous, complex machinery has been totally eliminated. The power required to operate the apparatus and carry out the necessary mechanical movements is extremely small compared to thinners presently in existence. The actual plant destruction means is especially effective for operation in soil for cutting plant roots.

While only one embodiment of this invention has been shown and described, it may be possible to practice the invention through the utilization of certain other embodiments without departing from the spirit and scope thereof. Such other embodiments form a part of this invention unless the following claims specifically state otherwise.

I claim:

1. An apparatus for thinning plants from a crop row, comprising: a frame movable in a direction along a crop row; a source of pressurized water; a water supply source; a pair of jet nozzles mounted on said frame, one of said jet nozzles pointed toward each side of the crop row; said jet nozzles directing jet streams of water from said supply source under pressure toward the crop row at generally right angles thereto for destruction of plants to be thinned therefrom; and means for interrupting said jet streams for selectively saving plants in the crop row.

2. An apparatus as defined in claim 1, said jet streams intersecting one another at a point under the surface of the ground below the plants in the crop row.

3. An apparatus for thinning plants from a crop row, comprising: a frame movable in a direction along a crop row; a source of pressurized water; a water supply source; a pair of jet nozzles mounted on said frame, one of said jet nozzles pointed toward each side of the crop row; said jet nozzles directing jet streams of water from said supply source under pressure toward the crop row at generally right angles thereto for destruction of plants to be thinned therefrom; a deflection plate movably supported at each side of the crow row; and means for moving said plates into the paths of said jet streams for selectively saving plants in the crop row.

4. An apparatus for thinning plants from a crop row, comprising: a frame movable in a direction along a crop row; a source of pressurized water; a water supply source; a pair of jet nozzles mounted on said frame, one of said jet nozzles pointed toward each side of the crop row; said jet nozzles directing jet streams of water from said supply source under pressure toward the crop row at generally right angles thereto for destruction of plants to be thinned therefrom; said jet nozzles adjustable for targeting said jet streams to intersect one another at a point under the surface of the ground below the plants in the crop row; a deflection plate movably supported at each side of the crop row; and means for moving said plates into the paths of said jet streams for selectively saving plants in the crop row.

5. An apparatus as defined in claim 4, including a plurality of said pairs of jet nozzles associated with said frame for thinning a plurality of crop rows.

6. An apparatus for thinning plants from a crop row, including: a pressure source; a liquid supply source; a jet nozzle supported at each side of the crop row and at generally right angles thereto for directing a jet stream including liquid from said supply source toward the crop row for destruction of plants to be thinned therefrom; said jet streams intersecting one another at a point under the surface of the ground below the plants in the crop row; and means for interrupting said jet streams for selectively saving plants in the crop row.

7. An apparatus for thinning plants from a crop row, comprising: a frame movable in a direction along a crop row; a source of pressurized non-combustible dense fluid; a pair of jet nozzles mounted on said frame, one of said jet nozzles pointed toward each side of the crop row; said jet nozzles directing jet streams including dense fluid under pressure toward the crop row at generally right angles to said direction of movement said jet streams being under sufficient pressure and exerting sufficient force to destroy plants solely by virtue of said force alone thereby providing a means for destruction of plants to be thinned therefrom; and means for interrupting said jet streams for selectively saving plants in the crop row.

8. An apparatus for thinning plants from a crop row, comprising: a frame movable in a direction along a crop row; a supply source of non-combustible dense fluid; means for pressurizing said dense fluid; a pair of jet nozzles mounted on said frame, one of said jet nozzles pointed toward each side of the crop row; said jet nozzles directing jet streams including pressurized dense liquid from said supply source towards the crop row at generally right angles to said direction of movement said jet streams being under sufficient pressure and exerting sufficient force to destroy plants solely by virtue of said force alone thereby providing a means for destruction of plants to be thinned therefrom; and means for interrupting said jet streams for selectively saving plants in the crop row.

References Cited by the Examiner

UNITED STATES PATENTS

| | | | |
|---|---|---|---|
| 2,557,303 | 6/1951 | McLemore. | |
| 2,569,320 | 9/1951 | Lea | 172—534 X |
| 2,899,776 | 8/1959 | Arnold. | |
| 2,963,821 | 12/1960 | Baker | 83—177 |
| 3,136,649 | 6/1964 | Keahey | 83—177 X |

FOREIGN PATENTS

| | | |
|---|---|---|
| 447,347 | 3/1948 | Canada. |
| 997,267 | 9/1951 | France. |
| 429,940 | 6/1926 | Germany. |
| 906,256 | 9/1962 | Great Britain. |

ABRAHAM G. STONE, *Primary Examiner.*

F. B. HENRY, *Assistant Examiner.*